Dec. 21, 1926.                                            1,611,741
              W. M. HALIBURTON
              REVERSE CURRENT RELAY
              Filed August 24, 1920

Inventor:
William M. Haliburton
by [signature]
         Att'y.

Patented Dec. 21, 1926.

1,611,741

UNITED STATES PATENT OFFICE.

WILLIAM M. HALIBURTON, OF MONTREAL, QUEBEC, CANADA, ASSIGNOR TO WESTERN ELECTRIC COMPANY, INCORPORATED, OF NEW YORK, N. Y., A CORPORATION OF NEW YORK.

REVERSE-CURRENT RELAY.

Application filed August 24, 1920. Serial No. 405,751.

This invention relates in general to devices for the protection of electrical apparatus against a reversal of current flow and more particularly to a reverse current relay for use in electrical systems in which two or more sources of electrical energy are connected.

In various applications of electricity, a plurality of sources of electrical energy are so connected in circuit with each other that it becomes necessary to insure that the direction of the current flow is not reversed, such being the case for example, when two or more generators are connected together in multiple to supply a feed circuit which it is important to maintain at a certain potential. Another place where such a device is required is in connection with the charging of storage batteries, since in such a case it is essential that means be provided to prevent the storage battery from discharging back through the generator in case the voltage of the latter drops below the voltage of the storage battery.

It is the object of the present invention to provide an improved form of reverse current relay which is efficient and accurate in operation and moreover one which is cheap to manufacture. To accomplish this object and in accordance with a feature of the invention, there is provided a reverse current relay in which the series and shunt coils are located on separate legs of an open magnetic circuit and means is provided for adjusting the gap in the magnetic circuit. This and other features of the invention will be more clearly understood by reference to the accompanying drawing in which Fig. 1 is a view in perspective of a relay device embodying this invention and particularly arranged for use in a battery charging circuit, and Fig. 2 shows diagrammatically the manner in which the device of Fig. 1 is connected in circuit.

Figure 1:
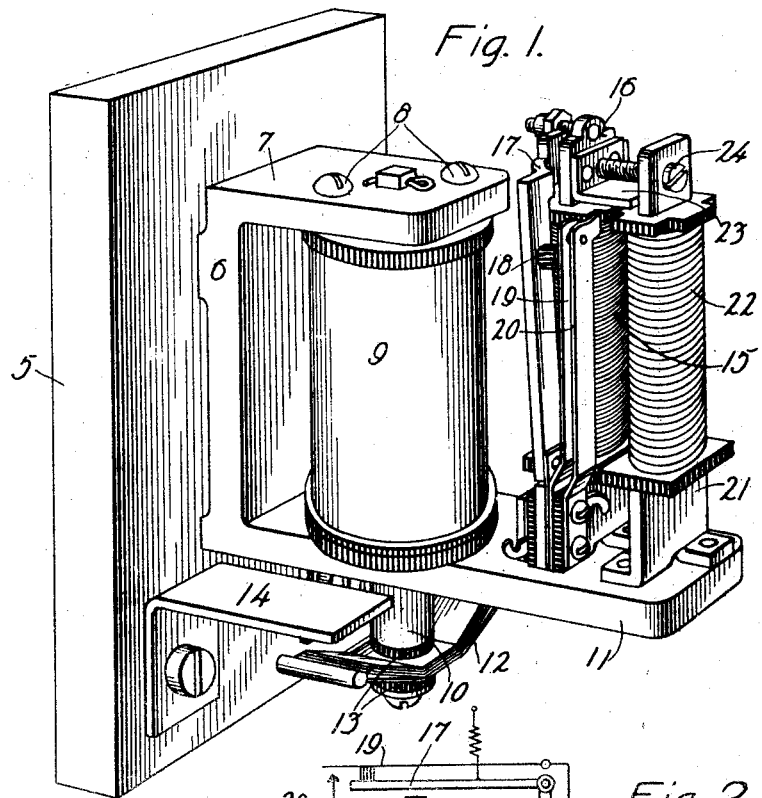

Referring more particularly to Fig. 1, there is disclosed a mounting plate 5 of insulating material upon which is mounted the soft iron bracket 6. Secured to the right-angled extension 7 of this bracket by means of the screws 8—8, is the coil 9 of a solenoid the core 10 of which extends through a suitable opening in the right-angled extension 11 of the bracket 6. The lower end of core 10 is arranged to carry a brush member 12, which is insulated therefrom by means of the insulating members 13—13, this brush contacting, when the solenoid is energized, with contact members 14—14. Secured to the extension member 11 is an electro-magnetic relay preferably of the type disclosed in Craft Patent No. 1,156,671, of October 12, 1915, and including an armature 17 and a comparatively high resistance shunt winding 15 round about a flat type core 16. Secured to the armature 17 is an insulating stud 18 which upon energization of the armature serves to cause the contact spring 19 to engage the contact spring 20. Also secured to the extension member 11 is a second core member 21 upon which is wound a series coil 22 of comparatively low resistance. Upon the outer end of core 16 is riveted or otherwise securely fastened, a right-angled core extension 23 preferably of soft iron. This member extends towards the outer end of core 21 and its separation therefrom is regulated by means of a brass adjusting screw 24 which threads into core extension 23 and is locked to the core 21 by means of a lock nut, not shown.

Figure 2:
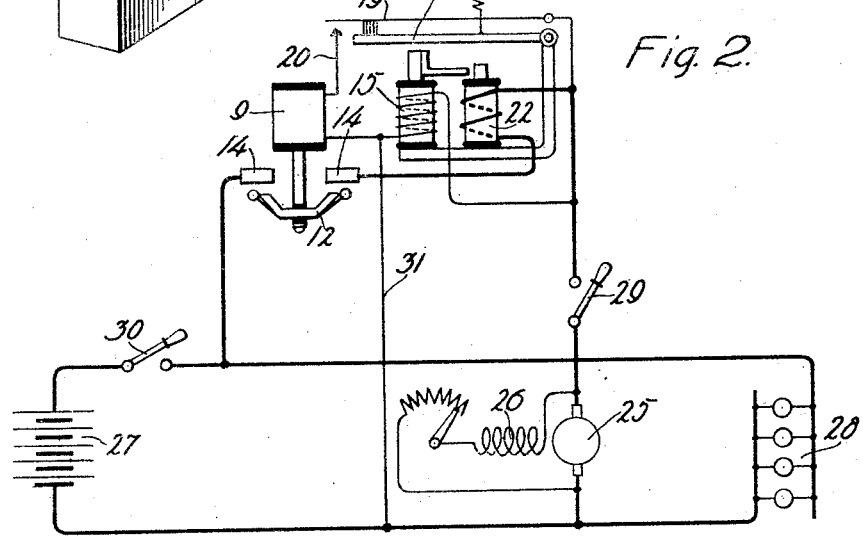

The manner in which this device may be used in a battery charging circuit is shown in Fig. 2 in which 25 represents a generator having an adjustable shunt field 26 and 27 represents a storage battery to be charged by the generator 25 and furnishing current for the lamps 28. Upon closure of the generator switch 29 and the battery switch 30, current flows from the generator 25 through the switch 29, the shunt winding 15 and thence along the conductor 31 back to the generator 25. If the current generated by the generator 25 is of sufficient voltage to charge the battery 27, the flow of current through the winding 15 causes the armature 17 to be attracted and by its movement to close the contacts 19—20, thus completing a circuit from the generator 25 through switch 29, contact 19—20, solenoid winding 9, and back to the generator through conductor 31. The flow of current through the solenoid winding 9 causes its core to be energized, in which case, the brush member 12, bridges the contacts 14—14. A charging circuit is thus completed from generator 25 through switch 29, series coil 22, contacts 14 and brush member 12, battery switch 30 to the positive pole of storage battery 27 thence from the negative pole of the battery back to the generator 25. The windings of coils 15 and 22 are so arranged with respect to the magnetic circuit that their magnetic effect is accumulated when the direction of current flow is such as to charge the battery 27. However, in case of a reversal of current such as would occur if the voltage of the charging generator fell below the voltage of the battery 27, the series coil 22 magnetizes its core in a direction opposed to the flux generated by coil 15, thus allowing the resultant flux to decrease to such a value that the armature 17 is retracted, interrupting the energization circuit for the solenoid line and allowing its core to fall back and open the charging circuit at the contact 14—14. By means of the adjusting screw 24, it is possible to coordinate the action of the series coil with the shunt coil so that the device will function to interrupt the charging circuit upon a reverse current of much smaller value than has been possible with similar devices used heretofore.

What is claimed is:

1. In combination, a mounting plate, a pair of cores mounted adjacent each other thereon, a magnetic extension projecting from the free end of one of said cores toward the free end of the other of said cores, means for placing a strain on said cores to cause a separation of the free ends thereof for varying the reluctance of the magnetic circuit, independent means for energizing said cores and an armature responsive to the resultant energization of said cores.

2. In combination, a mounting plate, a pair of cores mounted adjacent each other thereon, a magnetic extension projecting from the free end of one of said cores toward the free end of the other of said cores, means for placing a strain on said cores to cause a separation of the free ends thereof for varying the reluctance of the magnetic circuit, independent means for energizing said cores and an armature associated with one of said cores responsive to the resultant energization of both of said cores.

In witness whereof, I hereunto subscribe my name this 16th day of April A. D., 1921.

WILLIAM M. HALIBURTON.